United States Patent
Gravermann et al.

(10) Patent No.: US 12,553,921 B2
(45) Date of Patent: Feb. 17, 2026

(54) SENSORED INSULATION PLUG

(71) Applicant: 3M INNOVATIVE PROPERTIES COMPANY, St. Paul, MN (US)

(72) Inventors: Mark Gravermann, Erkelenz (DE); Gunther A. J. Stollwerck, Krefeld (DE); Christine B. Bund, Wuppertal (DE); Rainer Reeken, Dormagen (DE); Martin A. Milek, Oberhausen (DE); Mirco Gunjaca, Nottuln (DE)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

(21) Appl. No.: 18/249,665

(22) PCT Filed: Oct. 26, 2021

(86) PCT No.: PCT/IB2021/059899
§ 371 (c)(1),
(2) Date: Apr. 19, 2023

(87) PCT Pub. No.: WO2022/106937
PCT Pub. Date: May 27, 2022

(65) Prior Publication Data
US 2023/0305039 A1    Sep. 28, 2023

(30) Foreign Application Priority Data

Nov. 19, 2020  (EP) .................................... 20208737

(51) Int. Cl.
*G01R 15/06* (2006.01)
*G01R 15/16* (2006.01)
(Continued)

(52) U.S. Cl.
CPC ............. *G01R 15/06* (2013.01); *G01R 15/16* (2013.01); *H01B 3/40* (2013.01); *H01B 17/56* (2013.01)

(58) Field of Classification Search
CPC .......... G01R 15/06; G01R 15/16; H01B 3/40; H01B 17/56
See application file for complete search history.

(56) References Cited

U.S. PATENT DOCUMENTS

| 3,513,253 A | 5/1970 | Woods |
| 6,031,368 A * | 2/2000 | Klippel ................. G01R 15/06 324/133 |

(Continued)

FOREIGN PATENT DOCUMENTS

| DE | 19547120 A1 | 6/1997 |
| EP | 0691721 B1 | 8/1998 |

(Continued)

OTHER PUBLICATIONS

Extended European Search Report received for EP Application No. 20208737.5, mailed on May 7, 2021, 2 pages.

(Continued)

*Primary Examiner* — Dominic E Hawkins
(74) *Attorney, Agent, or Firm* — Gregg H. Rosenblatt

(57) ABSTRACT

Sensored insulation plug (1) for being inserted into a separable connector in a power distribution network comprises a plug body (140) formed by a solidified insulating material (610), and a primary capacitor (150), operable as a high-voltage capacitor in a voltage divider for sensing the elevated voltage. The primary capacitor includes a high-voltage electrode (160) for direct electrical connection to the elevated voltage. A sensing electrode (170) of a tubular shape, embedded in the plug body (140), arranged around the high-voltage electrode, comprises a deformable mesh of conductive wires forming a plurality of apertures between (Continued)

the wires to allow portions of the insulating material (610) on opposite sides of the mesh to be mechanically connected with each other by insulating material in the apertures while the insulating material solidifies and thereafter. A dielectric formed by a portion (180) of the insulating material (610) is arranged between the sensing electrode (170) and the high-voltage electrode (160).

19 Claims, 4 Drawing Sheets

(51) Int. Cl.
  *H01B 3/40* (2006.01)
  *H01B 17/56* (2006.01)

(56) References Cited

U.S. PATENT DOCUMENTS

| | | | | |
|---|---|---|---|---|
| 11,543,436 | B2* | 1/2023 | Bauer | G01R 15/165 |
| 2013/0106441 | A1* | 5/2013 | Yilmaz | G06F 3/0445 |
| | | | | 324/658 |
| 2013/0221236 | A1* | 8/2013 | Mastenbroek | C02F 1/325 |
| | | | | 313/493 |
| 2014/0302256 | A1* | 10/2014 | Chen | C23C 16/46 |
| | | | | 118/500 |
| 2016/0245845 | A1 | 8/2016 | Alberto | |
| 2018/0100878 | A1* | 4/2018 | Pearce | G01R 15/181 |
| 2019/0079046 | A1* | 3/2019 | Zeng | G01N 27/4045 |
| 2020/0064376 | A1* | 2/2020 | Loyd | G01R 15/06 |
| 2021/0018537 | A1* | 1/2021 | Bauer | G01R 15/16 |
| 2021/0278442 | A1* | 9/2021 | Wilson | G01R 15/06 |
| 2022/0118150 | A1* | 4/2022 | Keung | H05H 1/2406 |
| 2023/0115600 | A1 | 4/2023 | Stollwerck et al. | |

FOREIGN PATENT DOCUMENTS

| | | |
|---|---|---|
| EP | 0889487 A2 | 1/1999 |
| EP | 2605416 B1 | 6/2014 |
| WO | 2005037420 A2 | 4/2005 |
| WO | 2018211358 A1 | 11/2018 |
| WO | 2019186607 A1 | 10/2019 |
| WO | 2020070605 A1 | 4/2020 |

OTHER PUBLICATIONS

International Search Report received for PCT International Application No. PCT/IB2021/059899, mailed on Jan. 27, 2022, 5 pages.

* cited by examiner

SENSORED INSULATION PLUG

FIELD

The present disclosure relates to voltage sensing devices for high-voltage and medium-voltage power distribution networks, and particularly to voltage sensing devices, such as insulation plugs comprising elements of voltage sensors, that can be connected to separable connectors used in such networks, as well as to processes for manufacturing such voltage sensing devices.

BACKGROUND

Power distribution networks transmitting electrical power in large geographic areas, such as national grids, are becoming more complex to operate because nowadays consumers can generate energy on their premises and feed it into these networks in a decentralized manner, at unpredictable times and in unpredictable amounts. Network operators place voltage sensing devices in electrical installations at key locations of their network, such as in switchgears or transformers to collect information about the current state of their power network.

In a medium-voltage or high-voltage power distribution network, a power cable is typically connected to network apparatus, such as switchgears or transformers, by a separable connector, also often referred to as a removable power connector, mounted at the end of the cable. Such separable connectors have a front cavity to receive a protruding portion of a bushing of the apparatus, and a connection element on high or medium voltage. The connection element is in electrical contact with the cable conductor and can be mechanically and electrically connected to the bushing, e.g. via a threaded stud accessible through an opposed rear cavity of the separable connector. After installation, the rear cavity is filled with a so-called insulation plug, which insulates the connection element.

Elements of a voltage sensor for measuring the voltage of the connection element of a separable connector—and thereby the voltage of the power cable—can be integrated into the insulation plug, making it a "sensored insulation plug". A voltage sensor of that type is described, for example, in the U.S. Pat. No. 6,031,368.

In order to sense the voltage of the connection element with high accuracy, a capacitive voltage divider may be used, of which the dividing ratio is precisely known. The high-voltage portion of such a voltage divider is often a single capacitor of a smaller capacitance, the primary capacitor or the "high-voltage capacitor". Advantageously the primary capacitor, or the entire high-voltage portion, is accommodated in the sensored insulation plug, making use of the insulative properties of the body of the insulation plug.

In capacitive voltage dividers, the dividing capacitors are exposed to the elevated voltage of the power conductor and divide that elevated voltage, either in fewer and larger steps via a small number of "larger" capacitors having a higher impedance, or in more, smaller steps via a greater number of "smaller" capacitors having a lower impedance. While discrete capacitors are often used for the "smaller" capacitors, "larger" capacitors are often not discrete, but integrated capacitors, i.e. capacitors that are formed by structural elements of the insulation plug rather than by separate electrical elements.

In either case, the capacitors of the voltage divider require adequate electrical insulation in order to reduce the risk of electrical discharges between any capacitor on a high voltage and an element on lower voltage. Due to the strong electrical fields in the vicinity of the dividing capacitor(s) of the high-voltage portion of the voltage divider, the insulating material must be a good insulator and provide a high barrier to discharges. Any void or bubble in the insulating material may give rise to partial discharges.

Embedding capacitors of a medium-voltage/high-voltage (MV/HV) voltage divider in a solidified casting material is a proven method of obtaining a strong, mostly void-free electrical insulation, with the added benefit of mechanical rigidity of the voltage divider. When manufacturing such a capacitor assembly, a liquid, viscous, insulating casting material flows around the electrodes of integrated capacitors in a mold, filling all available space and thus reducing formation of voids. The casting material is then caused to cure and thereby solidify. The solidified insulating material forms the body of the sensored insulation plug.

Upon solidification and curing of the casting material, the casting material shrinks, while the embedded electrodes maintain their size, the electrodes being mostly made from metal. This shrinkage is believed to cause tension which tends to dissolve the bond between the casting material and the surface of an electrode over time, so that a gap may develop between the casting material and the electrode surface. Electrical discharges across the gap are likely to occur and will over time destroy the integrity of the capacitor assembly, thereby reducing its performance and reliability.

Where an electrode of an embedded integrated capacitor forms a barrier to the flow of the casting material, the electrode may be provided with slits to let the casting material flow to the other side of the electrode. The smaller the slits and the more viscous the casting material, the longer the casting process—and the higher the likelihood of the casting material not filling the entire available space and the likelihood of voids forming inside the cavity. The resulting capacitor assembly will have a higher risk of electrical discharges at those voids, and thus be generally less reliable.

The recently published international patent application WO 2019/186607 A1 addresses such problems. It proposes a capacitive voltage sensor comprising an electrode comprising a plurality of first elements having an elongated shape, arranged circumferentially side by side to form a tubular body and cantilevered with their distal ends joined to each other and their proximal ends free.

For better performance, i.e. less risk of delamination upon solidification and less risk of voids caused by inconsistent flow of the casting material, further improvement is desirable. It is also desirable to have a capacitor assembly at lower cost.

SUMMARY

The present disclosure attempts to address these needs. It provides, in a first fundamental aspect, a sensored insulation plug for being inserted into a rear cavity of a medium-voltage or high-voltage separable connector in a power distribution network of a national grid, and operable to insulate a connection element of the separable connector on an elevated voltage and to sense the elevated voltage. The sensored insulation plug comprises
 a) a plug body formed by a solidified insulating material, and
 b) a primary capacitor, operable as a high-voltage capacitor in a voltage divider for sensing the elevated voltage, the primary capacitor having i) a high-voltage electrode for direct electrical connection to the elevated voltage; ii) a sensing electrode of a tubular shape, embedded in the plug body, arranged around the high-voltage electrode, and comprising a mesh of conductive wires forming a plurality of apertures between the wires to allow portions of the insulating material on opposite sides of the mesh to be mechanically connected with each other by insulating material in the apertures while the insulating material solidifies and thereafter; iii) a dielectric formed by a portion of the insulating material arranged between the sensing electrode and the high-voltage electrode. The sensed insulation plug is characterized in that the mesh is a deformable mesh, adapted to be deformed by insulating material in liquid state flowing around the mesh before solidification of the insulating material.

Due to the sensing electrode comprising a mesh and due to this mesh being deformable by the flow of the liquid insulating material when the plug body is manufactured, e.g. by molding or casting, portions of the mesh can better follow any movement of the insulating material on a small scale. Because of the mesh being deformable, one portion of the mesh can follow a movement of the insulating material in its vicinity, while another portion of the mesh can follow a movement of the insulating material in its own vicinity. The deformability thereby allows portions of the mesh to follow movement of the insulating material in their respective vicinities independently from each other, or at least with less dependence from each other. Deformability thus ensures that portions of the mesh can follow local movement of the insulating material, as opposed to the entire mesh or the entire sensing electrode.

The insulating material can move during a casting or molding process, for example, or during some time thereafter (e.g. in thermal contraction or curing) while the material gradually solidifies until it forms a solid plug body. The deformability of the mesh facilitates various portions of the mesh following movements of the insulating material independently from each other, which in turn reduces the risk of formation of voids and the risk of mechanical tensions that may later result in delamination between the sensing electrode and the insulating material.

The present disclosure relates to voltage sensing devices for use in medium-voltage or high-voltage power distribution networks in which electrical power is distributed via HV/MV power cables, transformers, switchgears, substations etc. with currents of tens or hundreds of amperes and voltages of tens of kilovolts. The term "medium voltage" or "MV" as used herein refers to AC voltages in the range of 1 kilovolt (kV) to 72 kV, whereas the term "high voltage" or "HV" refers to AC voltages of more than 72 kV. Medium voltage and high voltage are collectively referred to herein as "elevated voltage".

Many separable connectors are T-shaped or elbow-shaped. A separable connector as referred to herein usually has a front cavity to receive a protruding portion of a bushing of the switchgear or the transformer, and an opposed rear cavity facilitating access to a connection element, such as a cable lug, on elevated voltage inside the separable connector. The connection element is conductive and is electrically and mechanically connected to the power conductor of the power cable. The connection element can be connected mechanically and electrically, e.g. by a conductive threaded stud, to a conductive element of the bushing, so that power can flow from the power cable through the connection element, the stud and the bushing into the switchgear or transformer. When the separable connector is in use, the connection element is on the elevated voltage of the power conductor of the cable.

Certain separable connectors are described in the European patent application EP 0 691 721 A1. Examples of traditional separable connectors are the 3M™ 600 Amp T-Bodies 5815 Series from 3M Co., St. Paul, Minnesota, U.S.A., or the "(M) (P) 480 TB separable tee shape connector" of Nexans Network Solutions N.V., Erembodegem, Belgium.

The rear cavity of a separable connector can receive a matching insulation plug to insulate the connection element and to fill the space of the rear cavity to reduce the risk of electrical discharges. Such matching pairs of separable connector and insulation plug are commercially available at moderate cost. In many cases, the mechanical interface between a separable connector and an insulation plug is governed by de-facto standards. Many of such interfaces conform to an existing standard for bushings, some form a Type C interface as described in the German standards DIN EN 50180 for bushings and DIN EN 50181 for plug-in type bushings, others conform to ANSI/IEEE standard 386. Often, bodies of insulation plugs are slightly larger than the rear cavity, so that after the plug is urged into the rear cavity with some force, the surfaces of plug and cavity are in an intimate surface contact, thus reducing the risk of electrical discharges.

The body of a sensored insulation plug according to the present disclosure is shaped for mating with a rear cavity of a separable connector in the same way as the body of a non-sensored insulation plug. The body of the sensored insulation plug may, for example, have a frustoconical shape for being inserted into a corresponding frustoconical recess of corresponding shape (the rear cavity) at a rear side of the separable connector, thereby mating the sensored insulation plug with the separable connector.

A connection element of a separable connector is electrically connected to the conductor of the power cable terminated by the separable connector and is on elevated voltage when the cable is in use.

Some separable connectors comprise a connection element such as a cable lug, attached to the end of the central conductor of the power cable and protruding into a space between the front cavity and the rear cavity. The protruding portion of the connection element usually has an aperture or a thread for attachment to a stud or screw which connects the connection element electrically and mechanically, e.g. with a conductor of a bushing.

The connection element serves to electrically and mechanically connect the power cable and the separable connector, e.g. to a bushing. The high-voltage electrode of the primary capacitor of the sensored insulation plug as described herein is—when in use—directly electrically connected to the connection element, so that a voltage sensor based on a voltage divider comprising the primary capacitor in its high-voltage portion can sense the elevated voltage of the connection element and thereby the elevated voltage of the power cable conductor, before and after connection of the power cable to the bushing.

The primary capacitor is operable as a high-voltage capacitor in a voltage divider for sensing the elevated voltage. The connection element is electrically connected to the voltage divider such that the voltage divider is usable to sense the elevated voltage of the connection element. For that purpose, the connection element on elevated voltage is electrically connected to the high-voltage electrode of the primary capacitor in the sensored insulation plug which in turn is operable as a high-voltage capacitor in a voltage divider for sensing the elevated voltage.

The high-voltage electrode of the primary capacitor may be not only electrically, but also mechanically connected to the connection element. This mechanical connection advantageously is an electrically conductive connection. The mechanical connection may be a direct mechanical connection, i.e. a portion of the high-voltage electrode is mechanically connected to the connection element without any intermediate element.

Alternatively, this connection may be an indirect mechanical connection, i.e. a portion of the high-voltage electrode is connected to the connection element via an intermediate element, which is electrically conductive. The sensed insulation plug may thus further comprise an intermediate element which is operable to mechanically and electrically connect the high-voltage electrode with the connection element. Such an intermediate element may be, for example, a contact piece. Such a contact piece may be connectable to the connection element of the separable connector, for example via a conductive threaded stud or screw that is threadedly connected to the contact piece on one side and that can, on the other side, be threadedly engaged with the connection element of the sensed insulation plug.

Hence in certain embodiments the sensed insulation plug further comprises a contact piece, operable to mechanically and electrically connect the high-voltage electrode with the connection element of the separable connector.

A contact piece of the sensed insulation plug according to the present disclosure may be the high-voltage-electrode, or it may comprise the high-voltage electrode. Where the contact piece comprises the high-voltage electrode, the contact piece may have an engagement portion to engage with an intermediate element connecting the contact piece electrically with the connection element of the separable connector, and an electrode portion forming the high-voltage electrode. The engagement portion and the electrode portion may be formed as a single piece, e.g. as a single piece of metal. Alternatively, they may be formed as separate elements.

The contact piece, or an engagement portion of the contact piece, may comprise a recess to connectingly engage a stud that is connected to the connection element of the separable connector. The contact piece, or an engagement portion of the contact piece, may comprise an internal or external thread to connectingly and threadedly engage a threaded stud that is connected to the connection element of the separable connector.

The outer shape of the sensed insulation plug according to the present disclosure may be generally symmetric about a plug axis, e.g. rotationally symmetric about a plug axis. The plug axis may be an axis which is parallel to a design insertion direction, i.e. a direction in which the sensed insulation plug, by design, is supposed to be inserted into a separable connector.

The plug axis defines axial directions, which are directions parallel to the plug axis, and radial directions, which are directions orthogonal to the axial directions.

The sensed insulation plug according to the present disclosure comprises a plug body formed by a solidified electrically insulating material. The shape of the plug body generally determines the outer shape of the sensed insulation plug. For durability and reliable functioning over years it is desirable that the plug body is mechanically rigid, has a high dielectric strength, has little variation of its relative permittivity with changes in temperature over the operating temperature range, does not absorb water, and does not age.

The insulating material is liquid during the manufacturing of the plug body and solidifies thereafter to form a rigid plug body. Solidification may be obtained by curing, hardening, crosslinking, or in other known manners. The insulating material may be, for example, a solidifiable, e.g. a hardenable or curable, liquid epoxy resin or a solidifiable, e.g. hardenable or curable, liquid mixture of an epoxy resin with other materials, such as fillers, or a solidifiable, e.g. hardenable or curable, polyurethane resin or a solidifiable, e.g. hardenable or curable, mixture of a polyurethane resin with other materials, such as fillers. Useful fillers are, for example, $SiO_2$ or $Al_2O_3$ or other electrically insulating inorganic materials. Alternatively, the insulating material may be or may comprise, for example, a ceramic material.

In certain embodiments the insulating material comprises an epoxy resin and, optionally, a filler, such as $SiO_2$ or $Al_2O_3$ or another electrically insulating inorganic material. Epoxy resins provide high electrical withstand, and much knowledge exists around molding or casting epoxy resins, furthermore they are available at moderate cost. Suitable fillers can help increase electrical withstand of the insulation material or to reduce its shrinkage upon solidifying. Where the insulation material is used as a dielectric in a capacitor, choosing a suitable filler may allow to adjust the coefficient of thermal expansion of the insulation material and thereby the variation of the capacitance of the primary capacitor with temperature.

The viscosity of the solidifiable insulating material in its liquid state is not critical, as long as it allows the liquid insulating material to be used, e.g. molded or cast, in known processes to form the plug body.

The plug body may have a generally rotationally symmetric outer shape. In order to be usable with many existing separable connectors the plug body may have a generally frustoconical outer shape, such that it can fill a frustoconical rear cavity of a separable connector without leaving too many or too large voids between the inner surface of the rear cavity and the outer surface of the plug body.

Advantageously the sensed insulation plug, and in particular the shape of the plug body of the sensed insulation plug, is adapted to conform to DIN EN 50180 or to DIN EN 50181, which are German industry standards for bushings. For use in other geographies it may be more advantageous that the sensed insulation plug, and in particular the shape of the plug body of the sensed insulation plug, is adapted to conform to industry standard ANSI/IEEE 386. When referring to an industry standard herein, the latest version as in force on 13 Oct. 2020 is meant, e.g. ANSI/IEEE standard 386-2016, published 14 Oct. 2016, is deemed to be the latest version in force on 13 Oct. 2020. Conformance to an industry standard, although not a requirement for sensed insulation plugs as described herein, may generally help obtain compatibility with a greater number of separable connectors.

Hence in certain embodiments the plug body is shaped such as to conform with the ANSI/IEEE standard 386 in its latest version as in force on 13 Oct. 2020.

The primary capacitor of the sensed insulation plug described herein is operable as a high-voltage capacitor in a voltage divider, which in use is electrically connected between the connection element on elevated voltage and electrical ground, for sensing the elevated voltage of the connection element of the separable connector. The voltage divider comprises, in its high-voltage portion, the primary capacitor of the sensed insulation plug described herein.

The voltage divider may be a capacitive voltage divider. In other words, both its high-voltage portion and its low-voltage portion (defined below) each consist of one or more capacitors, respectively, and are free of impedance elements of other types, such as resistors or inductances. In other embodiments the voltage divider is a mixed voltage divider, in which the high-voltage portion may comprise, beyond the primary capacitor, an inductance or a resistor, and in which the low-voltage portion comprises a capacitor and/or an inductance and/or a resistor.

The high-voltage portion of a voltage divider is the portion that is electrically arranged between a signal contact, at which a divided voltage can be picked up, and a contact for connection to the voltage which is to be sensed. The low-voltage portion of the voltage divider is the portion that is electrically arranged between that signal contact and a contact for connection to electrical ground.

The primary capacitor may be the only impedance element of the high-voltage portion of the voltage divider. In other words, there may be no other capacitor(s) and no other impedance elements electrically arranged between the elevated voltage and the signal contact of the voltage divider.

Independent of the number of capacitors in the voltage divider, the primary capacitor may be the first impedance element in an electrical chain of impedance elements of the voltage divider. In this chain, the primary capacitor may be arranged electrically at the end of the chain and may be adapted to be electrically connected directly with the elevated voltage. The primary capacitor would thus be the impedance element of the voltage divider which "sees" the full elevated voltage on its high-voltage electrode.

The primary capacitor may be directly electrically connected to the elevated voltage of the connection element, that is, the primary capacitor is electrically connected to the connection element without any intermediate element. In particular, the high-voltage electrode of the primary capacitor may be directly electrically connected to the elevated voltage, i.e. to the elevated voltage of the connection element. The high-voltage electrode of the primary capacitor may be directly electrically connected to the connection element. This direct electrical connection may be established, for example, through a contact piece, which is an electrically conductive mechanical element between the high-voltage electrode and the connection element of the separable connector.

The expressions "directly electrically connected" and "direct electrical connection" as used herein refer to a fully conductive (ohmic) electrical connection between two elements, e.g. via a wire or via a conductive path on a PCB or via a conductive element, without any intermediate electrical component such as a resistor, a capacitor or an inductor, being arranged electrically between the two elements.

Like most capacitors, the primary capacitor has two opposed electrodes (namely its high-voltage electrode and its sensing electrode) and a dielectric between the electrodes. The dielectric is formed by a portion of the plug body in that some of the plug body's insulating material is arranged between the sensing electrode and the high-voltage electrode. More specifically, the dielectric may be formed by a portion of the plug body in that some of the plug body's insulating material may be arranged between at least a portion of the sensing electrode and a portion of the high-voltage electrode.

The sensing electrode is generally of a tubular shape and is arranged around the high-voltage electrode, e.g. concentrically arranged around the high-voltage electrode, or at least around an axial portion of the high-voltage electrode. The sensing electrode of the primary capacitor may be connected to, or formed with, other components, e.g. components for support or electrical or mechanical connection of the sensing electrode, to form a sensing electrode assembly. Within a sensing electrode assembly, the sensing electrode is the element that is arranged opposite to the high-voltage electrode and that determines, in combination with the high-voltage electrode and the dielectric, the capacitance of the primary capacitor.

In certain preferred embodiments, the sensing electrode is shaped and arranged such as to be generally rotationally symmetric about the plug axis of the sensored insulation plug, and the high-voltage electrode is shaped and arranged such as to be generally rotationally symmetric about the plug axis of the sensored insulation plug. The high-voltage electrode and the sensing electrode may thus be arranged coaxially, or concentrically, with the sensing electrode being arranged around the high-voltage electrode. The sensing electrode being arranged around the high-voltage electrode implies that the sensing electrode, or at least an axial portion of the sensing electrode, is arranged radially outward from the high-voltage electrode and surrounds the high-voltage electrode.

The sensing electrode of the primary capacitor is embedded in the plug body. A portion of the embedded sensing electrode, or the entire sensing electrode, may be in surface contact with the insulating material of the plug body.

The sensing electrode may be electrically connected, or connectable, to a low-voltage capacitor, such that the primary capacitor and the low-voltage capacitor form a voltage divider for sensing the elevated voltage of a connection element of a separable connector. The primary capacitor may be comprised in, or may form, the high-voltage portion of the voltage divider, while the low-voltage capacitor may be comprised in, or may form, the low-voltage portion of the voltage divider.

The sensored insulation plug according to the present disclosure may comprise a grounding contact for electrically connecting an element of the sensored insulation plug to electrical ground. Where the sensored insulation plug comprises a low-voltage capacitor of the voltage divider, the sensored insulation plug may comprise a grounding contact for electrically connecting the low-voltage capacitor to electrical ground.

The mesh of conductive wires comprised in the sensing electrode is a deformable mesh. The term "deformation" as used herein refers to a change in size or shape. While in theory everything is deformable, the deformable mesh is adapted to be deformed by forces exerted by a typical insulating material in liquid state flowing around the mesh when the sensored insulation plug is produced in a casting or molding process.

The mesh may have a cylindrical shape initially, for example. During the casting process, liquid insulating material may flow at a certain speed and pressure towards the mesh and around it, thereby exerting a mechanical force on certain portions of the mesh (e.g. those portions close to an inlet of the liquid insulating material), and less or no force on certain other portions. Mesh portions closer to the inlet may then be deformed by the flow of insulating material and may be pushed towards the interior of the cylindrical shape, while other portions remote from the inlet may not be exposed to such pressure and will thus keep their original shape. After the casting process when the insulating material has solidified, the mesh may thus not have a strictly cylindrical shape any more, but rather the shape of a distorted cylinder, pushed inwards in certain positions. The distorted mesh is still deemed to be of a generally tubular shape. In specific embodiments the mesh has a generally cylindrical shape defining an axial direction and radial directions orthogonal thereto, and the mesh is adapted to be deformed in radial directions.

The mesh is supposed to be deformable by some displacement distance, i.e. a portion of the mesh may be displaced by the displacement distance due to the flow of insulating material in liquid state flowing towards and around that portion of the mesh before solidification. As the size of many sensed insulation plugs is given by the standardized size of the rear cavity of the separable connectors into which the plugs are to be inserted, the size of the tubular-shaped sensing electrode is expected to be below 20 centimeters (cm) in diameter, preferably below 15 cm, more preferably below 10 cm. The radial distance between the radially inner surface of the sensing electrode and the radially outer surface of the high-voltage electrode is expected to be less than 5 cm, more likely less than 3 cm, and may be less than 1 cm.

The radial distance between the mesh and the high-voltage electrode is typically between 1 mm and 10 mm. Deformation of the mesh should not result in the mesh contacting the high-voltage electrode. The deformation of the mesh in radial direction should be limited such that after deformation there will still be a sufficient thickness of insulating material between the high-voltage electrode and the sensing electrode to prevent electrical discharges. For that reason, deformation of the mesh in radial direction should be limited to a displacement distance of 5 mm, preferably to a displacement distance of 2 mm, more preferably to a displacement distance of 1 mm. The displacement distance can be limited, for example, by incorporating support rings into the mesh or by selecting appropriate material, modulus and/or diameter of the wires of the mesh. Hence in certain embodiments the mesh is adapted to be deformed in radial direction by insulating material in liquid state flowing around the mesh before solidification of the insulating material by a displacement distance of less than 1 millimeter.

The conductive wires forming the mesh may be connected with each other, e.g. by weaving the wires or by knotting or looping, to provide electric connection and some mechanical stability. Hence the mesh may be a woven mesh or a knotted mesh or a looped mesh.

The deformability of the mesh originates, amongst other factors, from the conformability or ductility of the wires forming the mesh. Thinner wires of a ductile material will tend to form a more deformable mesh, while thicker wires of a rigid material will tend to form a more rigid, less deformable mesh. Wires of a suitable material and of thicknesses (diameters) of between 0.05 millimeter (mm) and 1 mm are considered suitable to yield a deformable mesh, and wire thicknesses between 0.1 mm and 0.5 mm have been found particularly useful. In certain embodiments the wires have a diameter of between 0.05 mm and 1 mm.

The softness or the rigidity of the materials of the wires also has an impact on the deformability of the mesh. Wires of a suitable thickness and of a ductile copper, gold or silver material are considered suitable to yield a deformable mesh. Suitable deformable meshes can, for example, be obtained using wires of stainless steel having a shear modulus, at room temperature, of about 80 giga pascal (GPa), or wires of copper having a shear modulus of about 45 GPa.

In certain embodiments the mesh is a plastically deformable mesh. As is known, a plastically deformable mesh, after deformation, is not striving to return to its original shape. This may reduce tensions in the insulating material after solidifying.

In certain alternative embodiments the mesh is an elastically deformable mesh. As is known, an elastically deformable mesh, after deformation, strives to return to its original shape. An elastically deformable mesh maybe, for example, a flexible mesh. A flexible mesh can be reversibly flexed or bent—in similar ways to how known flexible printed circuit boards ("Flex PCBs") can be flexed or bent. An elastically deformable mesh may be better suited to return to a desired shape after molding and before solidification, and thus help obtain a desired mesh geometry.

A cylindrical mesh, for example, that comprises a portion of its outer surface which is radially deformed by at least 1 mm by a steel ball of 50 grams of weight laid on that portion is considered deformable. As opposed to that, a cylindrical mesh, for example, that is deformed by less than 0.5 mm by a steel ball of 50 grams of weight laid on any portion of the outer surface of the mesh is not considered deformable.

The sensing electrode comprises a mesh of conductive wires forming a plurality of apertures between the wires. In some embodiments the sensing electrode is a mesh of conductive wires forming a plurality of apertures between the wires. The wires of the deformable mesh may be copper wires, silver wires, aluminium wires, or stainless-steel wires, for example. More generally, the wires of the deformable mesh may comprise, for example, copper, silver, gold, aluminium, or stainless steel, or combinations or mixtures or alloys of two or more of these.

The apertures allow portions of the insulating material on opposite sides of the deformable mesh to be mechanically connected with each other by insulating material in the apertures while the insulating material solidifies and thereafter. A liquid insulating material can flow into the apertures, so that insulating material in the apertures mechanically connects a portion of the insulating material on one side of the mesh with a portion of the insulating material on the opposite side of the mesh, both during and after solidification. Hence in certain embodiments, at least one aperture of the plurality of the apertures is filled with insulating material mechanically connecting portions of the insulating material on opposite sides of the mesh with each other.

The apertures extend through the deformable mesh in a thickness direction of the mesh. The thickness of the mesh may be, for example, between about 0.1 mm and about 2 mm, preferably between about 0.2 mm and about 1 mm. Thicker meshes tend to be less deformable and may add to weight of the sensored insulation plug more than necessary. Wires forming the mesh may have diameters, for example, of 0.05 mm or more, 0.2 mm or more, 0.5 mm or more, or 1.0 mm or more.

For viscosities of the insulating material of less than about 20'000 mPa·s at 60° C., the size of the apertures may advantageously be chosen to be at least about 0.1 mm in their shortest extensions. In certain embodiments the apertures have respective sizes of between 0.05 mm and 2 mm, as measured in the shortest extension of each aperture. In certain embodiments the size of the apertures is 0.1 mm or greater, or 0.5 mm or greater, in their shortest extension. The extension of an aperture as used herein is measured along the surface of the mesh of conductive wires, not in the thickness direction of the mesh, i.e. not orthogonal to the surface of the mesh. Apertures having these sizes are believed to be more consistently filled with liquid insulating material, such that insulating material in the apertures can act as "bridges" between portions of the insulating material on opposite sides of the mesh.

Within the limits outlined above, it is generally preferred for the deformable mesh to have more smaller apertures, as opposed to fewer larger apertures, as this is believed to enhance cohesion between portions of the insulating material on opposite sides of the mesh. In certain embodiments of the sensored insulation plug described herein, the mesh of conductive wires forms one thousand or more apertures. A large number of apertures, like one thousand or more apertures, provides a large number of "bridges" between portions of the insulating material on opposite sides of the mesh and can thereby enhance cohesion and reduce the risk of delamination of insulating material at the sensing electrode.

Besides the size of the apertures it is also the number of apertures in the mesh of conductive wires which determines how well the portion of the casting material outside the mesh (i.e. radially outward of the mesh) is connected with the portion of the casting material inside the mesh (i.e. inside the tube formed by the tubular sensing electrode, radially inward from the mesh). Under these aspects more apertures are desirable but this needs to be balanced against the effect of reducing the surface of the sensing electrode by having more apertures, which typically reduces the capacitance of the primary capacitor.

In a specific embodiment, the deformable mesh is a mesh of stainless-steel wires of 0.2 mm wire thickness forming apertures of a size of about 0.1 mm between the wires.

For elevated voltages of about 50 kV, frequencies of about 50 Hz and target dividing ratios of the voltage divider of about 5000, a suitable capacitance of the primary capacitor is in the order of 30 pF (Picofarad). When designing the primary capacitor, further factors like the permittivity of the insulating material and the geometry of the electrodes must be considered, as is generally known.

The expression "embedded in the plug body" as used herein refers to being surrounded completely by portions of the plug body. In particular, an electrode is considered embedded in the plug body if the plug body is cast or molded around the electrode. In particular, an element of the sensored insulation plug may be considered embedded in the plug body if a major portion, e.g. more than 90% or more than 95%, of its exterior surface is in surface contact with the insulating material. Surface contact, however, is not a prerequisite for being considered "embedded", as an embedded element may, for example, be arranged in a cavity of the plug body without being in surface contact with the insulating material.

The high-voltage electrode of the primary capacitor may be embedded in the plug body. A portion of an embedded high-voltage electrode, or an entire embedded high-voltage electrode, may be in surface contact with the insulating material of the plug body.

In certain embodiments the sensored insulation plug according to the present disclosure further comprises a shield electrode of generally tubular shape, embedded in the plug body, arranged around, and enveloping, the sensing electrode. The shield electrode is arranged around the sensing electrode in order to help shield the sensing electrode of the primary capacitor against external electrical fields and thereby to improve the accuracy of the voltage sensing. The shield electrode may be held on a fixed voltage, e.g. on ground potential. Where the sensored insulation plug comprises a grounding contact for connection to ground, the shield electrode may be electrically connected to the grounding contact. A shield electrode can help minimize the impact of external electrical fields on the sensing electrode, can reduce parasitic capacitances in the voltage divider in which the primary capacitor is comprised, and thereby can enhance the accuracy of the voltage sensing.

The shield electrode may have a generally tubular shape. The tubular shape defines a length direction of the shield electrode. The shield electrode may be advantageously arranged such that its length direction extends in an axial direction of the plug body.

In certain embodiments the sensing electrode has a rotationally symmetric shape, the shield electrode has a rotationally symmetric shape, and the shield electrode is arranged concentrically around the sensing electrode. Such a concentric arrangement provides for an even shielding, a low risk of electric discharge, saves space in the sensored insulation plug, and is cost-effective to manufacture.

The shield electrode may comprise a plurality of radial through-holes. During production of the sensored insulation plug as described herein, such through-holes or apertures may allow for liquid insulating material forming the plug body to enter more easily the space between the shield electrode and the sensing electrode, before the insulating material solidifies and forms the plug body.

In certain embodiments, the shield electrode is a mesh of conductive wires, e.g. stainless steel wires or copper wires, similar to the wires described above for the deformable mesh of the sensing electrode.

The sensing electrode is typically on a potential of a few volt, while the shield electrode is typically on ground potential. A major surface of the sensing electrode and a major surface of the shield electrode may thus be arranged relatively close to each other without risking an electrical discharge between them. Since the sensing electrode comprises the deformable mesh, upon deformation the mesh may contact the shield electrode mechanically and electrically, which would make voltage sensing impossible. To avoid a mechanical contact between the sensing electrode and the shield electrode, an electrically insulating spacer layer may be arranged between the sensing electrode and the shield electrode. The spacer layer may be deformable by insulating material in liquid state flowing around the spacer layer before solidification of the insulating material. The insulating spacer layer may be, for example, a polymeric layer such as a layer of a polymeric film, or a layer of a nonwoven material.

Manufacturing and assembly of the sensored insulation plug may be easier if the spacer layer can be attached to the sensing electrode before the molding process. Hence in certain embodiments the spacer layer is attached to the mesh of the sensing electrode by an adhesive layer.

Flow of the liquid insulation material may be facilitated by apertures in the spacer layer. Hence in certain embodiments the spacer layer comprises apertures for allowing flow of liquid insulation material through the spacer layer. In certain embodiments the spacer layer comprises a layer of nonwoven material comprising porous apertures for allowing flow of liquid insulation material through the spacer layer. An example of a suitable material for a spacer layer comprising a layer of nonwoven material having porous apertures is a porous adhesive tape like, for example, 3M™ Micropore™ Surgical Tape, available from 3M Company, St. Paul, Minnesota, U.S.A. In other embodiments the spacer layer comprises a polymeric film having apertures for allowing flow of liquid insulation material through the spacer layer. In other embodiments the spacer layer comprises a polymeric foam tape having apertures for allowing flow of liquid insulation material through the spacer layer.

Hence generally, in certain embodiments, the sensored insulation plug further comprises an electrically insulating spacer layer arranged radially between the shield electrode and the sensing electrode, wherein optionally the spacer layer comprises a layer of nonwoven material or a polymeric layer.

Generally, the shield electrode may be rigid or it may be deformable. A deformable shield electrode may be made from, or comprise, for example, a conductive layer on a deformable foil or on a paper substrate. A deformable shield electrode may be made from, or comprise, for example, a deformable metal foil or a deformable metal sheet. In certain embodiments, a deformable shield electrode comprises a deformable stainless-steel foil, a deformable copper foil or a deformable aluminium foil. A deformable shield electrode may be comprised, for example, in a flexible circuit board, such as a flexible printed circuit board. Where the plug body is manufactured using a solidifiable insulating material, e.g. epoxy, in a casting process or molding process, a deformable shield electrode can move during the solidification and any related movement of the insulating material. A deformable shield electrode can thus "follow" the moving insulating material as it flows, solidifies and shrinks. This may result in a lower risk of delamination between the shield electrode and the insulating material and in a lower risk of voids being generated in the plug body. Less voids generally means less risk of electrical discharges, making the sensored insulation plug more reliable.

In certain embodiments the shield electrode comprises a conductive layer arranged on an electrically insulating substrate.

In certain embodiments the shield electrode is formed by a conductive layer of a circuit board, e.g. of a printed circuit board ("PCB"). The shield electrode is thus comprised in the circuit board. The shield electrode may be, for example, applied on a substrate of the circuit board. The conductive layer may be arranged on an outer surface of the circuit board, or it may be arranged within the circuit board. The circuit board may be of a generally tubular shape for the shield electrode to be of a generally tubular shape. The circuit board may be, for example, a rigid circuit board or a flexible circuit board. Rigid circuit boards are generally stiff, they often comprise an insulating substrate like an FR-2 or an FR-4 material, both widely known from printed circuit boards. The substrate of a circuit board provides mechanical strength to the circuit board. Flexible circuit boards can be flexed and bent, as is generally known. They comprise a flexible substrate like, for example, Kapton or a polyimide film on which conductive traces are applied that connect electronic elements mounted on the surface of the substrate.

Where the sensored insulation plug comprises a shield electrode, it may also comprise a grounding contact for electrically connecting the shield electrode to electrical ground.

The sensing electrode may extend perpendicularly from a support platform supporting the sensing electrode. The support platform may be, or comprise, a circuit board, such as a printed circuit board ("PCB"). The support platform may comprise opposed major surfaces, parallel to each other and spaced from each other in a thickness direction. The support platform may be arranged such that its thickness direction is an axial direction of the sensored insulation plug and its major surfaces extend in radial directions.

Hence in certain embodiments the sensored insulation plug according to the present disclosure further comprises a circuit board, embedded in the plug body and supporting the sensing electrode. A circuit board is a cost-effective means to support the sensing electrode and/or its mesh mechanically. Also, such a circuit board facilitates the making of electrical connections of the sensing electrode to other elements, such as the signal contact, which may be arranged on the circuit board.

Sensored insulation plugs according to the present disclosure can advantageously be used in power distribution networks for high-precision sensing of the elevated voltage at a specific location of a power line, e.g. at a switchgear or at a transformer. Where a separable connector is used to connect a power cable to a switchgear or to a transformer, the sensored insulation plug can be inserted into the rear cavity of the connector. By replacing a regular, non-sensored insulation plug in a separable connector with a the sensored insulation plug as described herein, the separable connector can be upgraded to now comprise a voltage sensor. A voltage divider, in which the primary capacitor of the sensored insulation plug forms a part of the high-voltage portion, can be used to sense, with high precision, the elevated voltage of the separable connector. The present disclosure therefore also provides a power distribution network for distributing electrical power at medium or high voltages, the network comprising a) a separable connector having a rear cavity and a connection element on elevated voltage when in use and accessible through the rear cavity; and b) a sensored insulation plug as described herein, inserted into the rear cavity to insulate the connection element and to sense the elevated voltage of the connection element, wherein the high-voltage electrode is directly electrically connected with the connection element.

The present disclosure provides, in a second fundamental aspect, a process to manufacture a sensored insulation plug as described above. Specifically, it is provided a process of making a sensored insulation plug for being inserted into a rear cavity of a medium-voltage or high-voltage separable connector in a power distribution network of a national grid, and operable to insulate a connection element of the separable connector on elevated voltage and to sense the elevated voltage, comprising the steps, in this sequence, of a) providing a high-voltage electrode of a primary capacitor for direct electrical connection to the elevated voltage, and a sensing electrode of the primary capacitor, having a tubular shape and comprising a mesh of conductive wires forming a plurality of apertures between the wires to allow portions of an insulating material on opposite sides of the mesh to be mechanically connected with each other by insulating material in the apertures while the insulating material solidifies and thereafter, wherein the mesh is a deformable mesh, adapted to be deformed by insulating material in liquid state flowing around the mesh before solidification of the insulating material;

b) arranging the sensing electrode around the high-voltage electrode;

c) molding or casting a liquid insulating material around the high-voltage electrode and the sensing electrode for forming a plug body of the sensored insulation plug, such that the sensing electrode is embedded in the insulating material and such that a portion of the insulating material forms a dielectric between the sensing electrode and the high-voltage electrode; and d) solidifying the insulating material.

Such a process allows for cost-effective manufacturing of the sensored insulation plug and ensures, in a reliable way, that the plug body contains fewer voids. The process also facilitates production of sensored insulation plugs of various outer shapes without the need to redesign the electrodes.

BRIEF DESCRIPTION OF THE FIGURES

The disclosure will now be described in more detail with reference to the following FIGS. exemplifying particular embodiments. Like elements are designated by like reference numbers.

DETAILED DESCRIPTION

Figure 1:
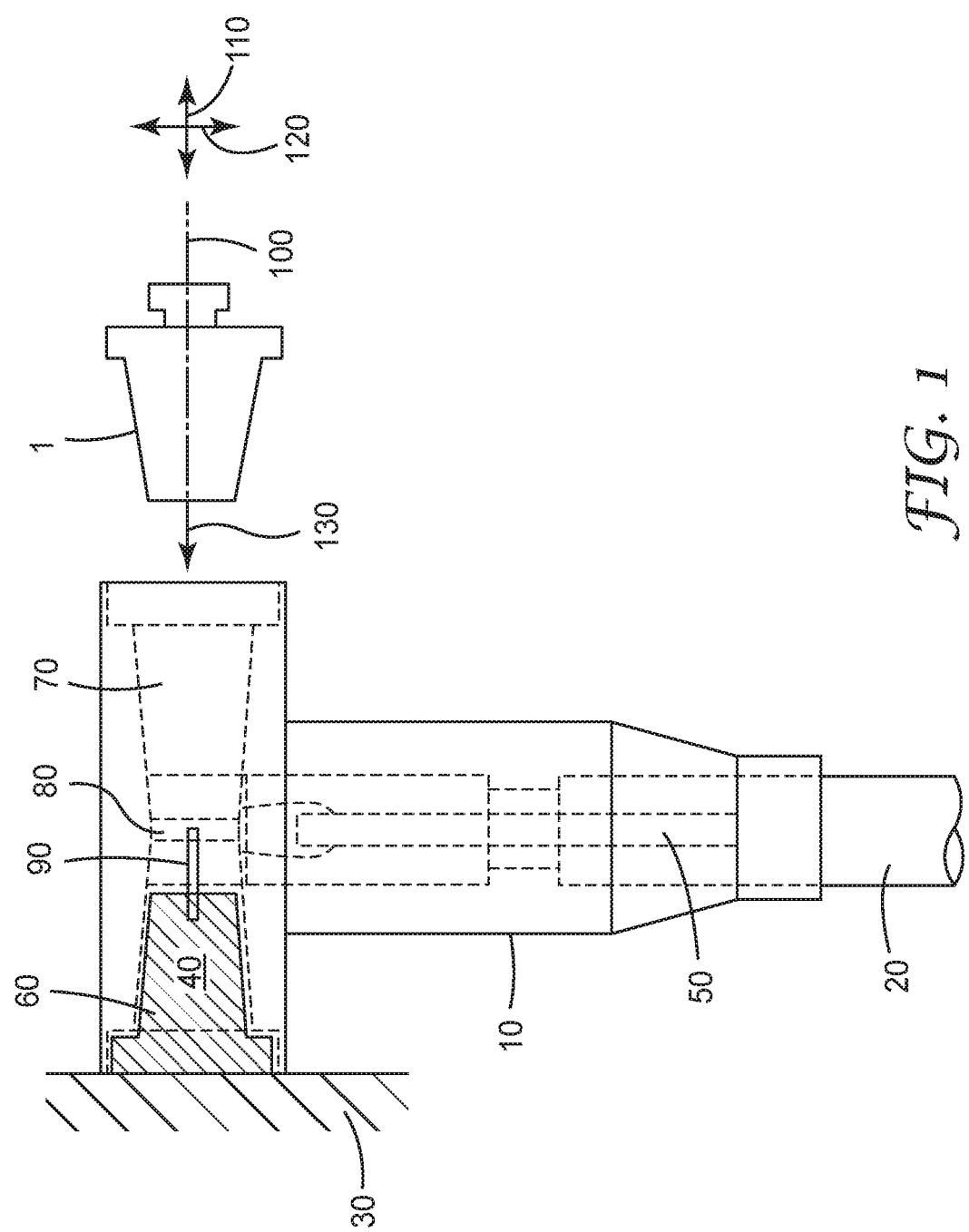
FIG. 1 Sectional view of a separable connector and a first sensored insulation plug according to the present disclosure.

The sectional view of FIG. 1 illustrates a separable connector 10 and a first sensored insulation plug 1 according to the present disclosure. The separable connector 10 is arranged at an end of a medium-voltage power cable 20 and connects, via a bushing 40, the power-carrying central conductor 50 of the cable 20 to a medium-voltage switchgear 30 in a power distribution network of a national grid.

The separable connector 10 is a T-shaped separable connector 10 and comprises a front cavity 60 for receiving the bushing 40, and a rear cavity 70 for receiving an insulation plug of a matching shape. The insulation plug may be a traditional insulation plug without elements of a sensor or a sensored insulation plug 1 according to the present disclosure, shown in FIG. 1 to the right of the rear cavity 70, before being inserted into the rear cavity 70. A traditional insulation plug and a sensored insulation plug 1 according to the present disclosure both serve to electrically insulate a connection element 80 of the separable connector 10, which is electrically connected to the central conductor 50 of the cable 20 and can be electrically and mechanically connected to a conductive component of the bushing 40 via a threaded stud 90. In use, the connection element 80 is on the elevated voltage of the central conductor 50 of the cable.

A sensored insulation plug 1 according to the present disclosure, just like a traditional insulation plug, has an overall frustoconical outer shape, generally rotationally symmetric about a plug axis 100 which defines axial directions 110 and radial directions 120, which are directions orthogonal to the axial directions 110. The sensored insulation plug 1 can be inserted into the rear cavity 70 by moving it axially in an axial insertion direction 130 into the rear cavity 70 where it can be threadedly engaged—and thereby electrically connected—with the connection element 80 on elevated voltage. The geometry of the sensored insulation plug 1 is adapted to conform to ANSI/IEEE standard 386.

The sensored insulation plug 1 comprises a primary capacitor, which can be electrically connected to the connection element 80 on elevated voltage and which is operable as a high-voltage capacitor in a voltage divider for sensing the elevated voltage, as will be explained in the context of the other Figures.

Figure 2:
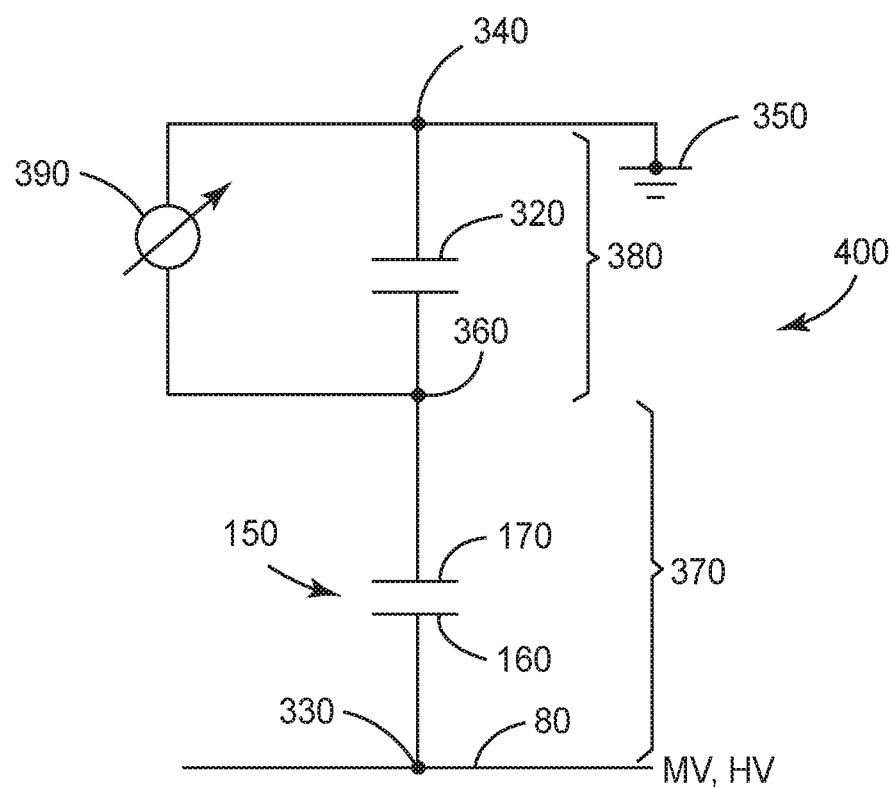
FIG. 2 Circuit diagram of a voltage divider in which a sensored insulation plug according to the present disclosure can be used.

FIG. 2 is a circuit diagram of a voltage divider 400 for sensing the elevated voltage of the separable connector 10 in which the sensored insulation plug 1 of the present disclosure can be used.

The voltage divider 400 for sensing the elevated voltage of the separable connector 10 is shown electrically connected to a connection element 80 of the separable connector 10 on medium or high (i.e. elevated) voltage. The voltage divider 400 comprises a high-voltage capacitor 150, corresponding to the primary capacitor 150 in the sensored insulation plug 1 described below, and a low-voltage capacitor 320. These two capacitors are electrically connected in series between a high-voltage contact 330 and a grounding contact 340, held on electrical ground 350.

The high-voltage contact 330 facilitates electrical connection to the connection element 80 on elevated voltage. The grounding contact 340 facilitates connection of the voltage divider 400 to electrical ground 350.

A signal contact 360 is arranged electrically between a high-voltage portion 370 and a low-voltage portion 380 of the voltage divider 400. At the signal contact 360, a divided voltage, also referred to herein as the signal voltage, can be picked up, which varies proportionally with the elevated voltage of the connection element 80. The dividing ratio, i.e. the proportionality factor between the elevated voltage and the signal voltage, depends on the ratio of the total impedance of the high-voltage portion 370 to the total impedance of the low-voltage portion 380 of the voltage divider 400. By measuring the signal voltage of the signal contact 360 using a voltmeter 390 and applying the proportionality factor, the elevated voltage of the connection element 80 can be sensed.

In the illustrated embodiment, the high-voltage portion 370 comprises only one capacitor, namely the primary capacitor 150, with its high-voltage electrode 160 and its sensing electrode 170. In other embodiments the high-voltage portion 370 may comprise, beyond the primary capacitor 150, one or more further capacitors. It may comprise, beyond the primary capacitor 150, one or more further impedance elements, such as one or more resistors and/or one or more inductors.

Similarly, in the illustrated voltage divider 400, the low-voltage portion 380 comprises only one capacitor, namely the low-voltage capacitor 320. In other embodiments the low-voltage portion 380 may comprise, beyond the low-voltage capacitor 320, one or more further capacitors. It may comprise, beyond the low-voltage capacitor 320, one or more further impedance elements, such as one or more resistors and/or one or more inductors.

Figure 3:
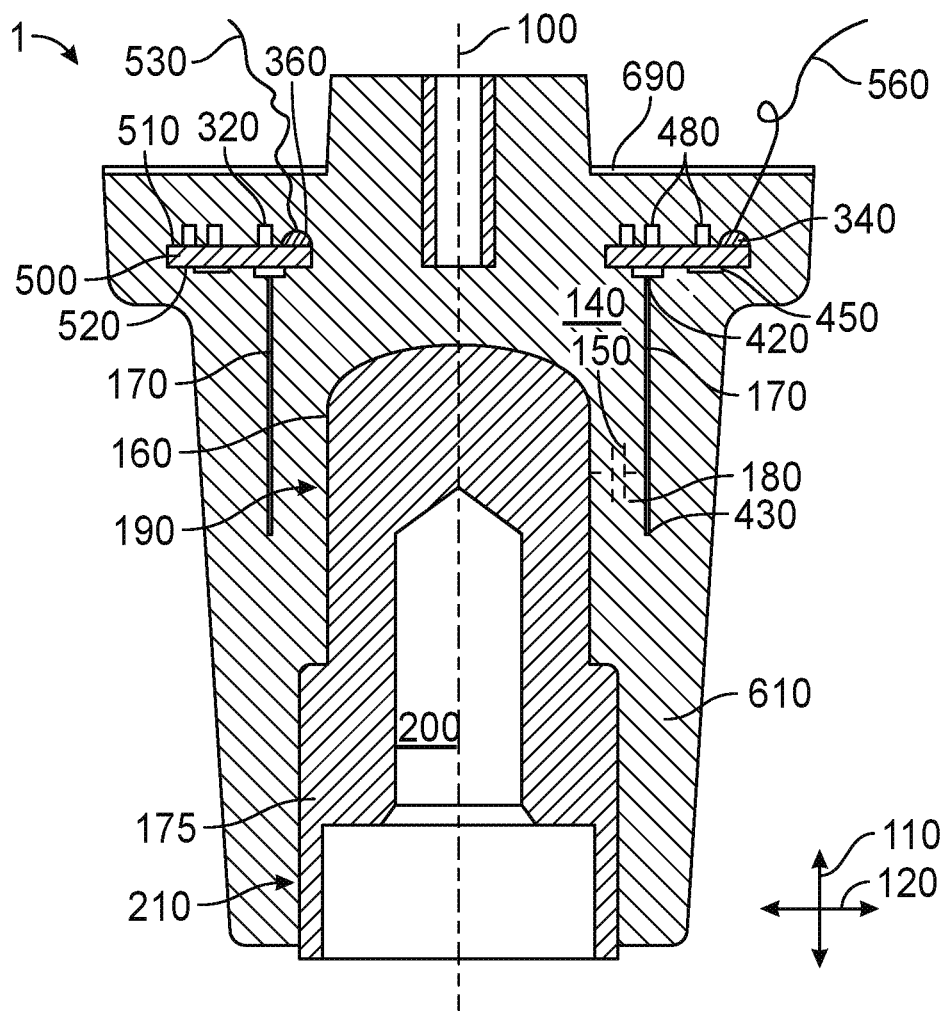
FIG. 3 Sectional view of the first sensored insulation plug according to the present disclosure.

FIG. 3 shows, in a sectional view, the first sensored insulation plug 1 according to the present disclosure of FIG. 1 in greater detail. The sensored insulation plug 1 comprises a plug body 140 of an insulating material 610, namely an electrically insulating hardened resin 610, and a primary capacitor 150, formed by a high-voltage electrode 160 and a sensing electrode 170, which are both rotationally symmetric about a plug axis 100. The dielectric of the primary capacitor 150 is formed by a portion 180 of the insulating material 610 of the plug body 140, located between the high-voltage electrode 160 and the sensing electrode 170.

The high-voltage electrode 160 is generally rotationally symmetric about the plug axis 100 and is comprised in an electrode portion 190 of a contact piece 175 made of conductive metal. The contact piece 175 is generally rotationally symmetric about the plug axis 100 and has, further to the electrode portion 190, an engagement portion 210 for mechanical engagement with an intermediate element connecting the contact piece 175 electrically with the connection element 80 of the separable connector 10. The electrode portion 190 forms the high-voltage electrode 160. The engagement portion 210 and the electrode portion 190 are formed as a single piece of metal.

The contact piece 175 comprises a threaded recess 200 to connectingly engage a stud 90 for mechanical and direct, i.e. ohmic, electrical connection of the contact piece 175 to the connection element 80 of the separable connector 10. In use, the entire contact piece 175 and in particular its electrode portion 190 are on the elevated voltage of the connection element 80 of the separable connector 10.

The sensing electrode 170 is a deformable mesh 170 of stainless-steel wires. It has a generally tubular shape and is arranged concentrically around the high-voltage electrode 160. A proximal edge 420 of the sensing electrode 170 is attached to a supporting circuit board 500, while a distal edge 430 is axially spaced from the circuit board 500 by the length of the sensing electrode 170, i.e. its extension in axial direction 110.

The sensing electrode 170 is completely surrounded by the insulating material 610 of the plug body 140, including on its radially inner surface and on its radially outer surface. In other words, it is embedded in the plug body 140. The major surfaces of the sensing electrode 170 are in surface contact with the insulating material 610 of the plug body 140 in which the sensing electrode 170 is embedded.

In particular, a portion 180 of the insulating material 610 is present between the sensing electrode 170 and the high-voltage electrode 160, so that the insulating material 610 forms a dielectric of the primary capacitor 150.

The insulating material 610 of the plug body 140 is a hardened epoxy resin. In manufacturing, the resin in its liquid state is cast or molded around the high-voltage electrode 160 and the sensing electrode 170 in a mold that determines the outer shape of the sensored insulation plug 1. A major part of the resin 610 flows under pressure towards and around the mesh 170 of the sensing electrode 170, and portions of the resin fill the apertures 600 between the wires of the mesh 170. These portions thus connect insulating material 610 radially inside the sensing electrode 170 with insulating material 610 radially outside the sensing electrode 170. The resin is then cured or hardened to solidify, resulting in a solid insulating plug body 140 in which the sensing electrode 170 is embedded.

The apertures (shown in FIG. 4) between the wires of the mesh 170 facilitate, during production of the sensored insulation plug 1, the flow of liquid insulating material 610 into the space between the sensing electrode 170 and the high-voltage electrode 160. Portions of the insulating material 610 remaining in the apertures 600 later connect insulating material 610 radially inside the sensing electrode 170 with insulating material 610 radially outside the sensing electrode 170.

The electrical breakdown strength of the insulating material 610 is high enough to reliably prevent electric discharges between the high-voltage electrode 160 on elevated voltage and the sensing electrode 170.

The sensing electrode 170 is mechanically supported by the circuit board 500, which is a flat, rigid circuit board 500 of generally annular shape, arranged concentrically with the plug axis 100. The circuit board 500 comprises conductive traces by which electric and electronic components 480, such as the sensing electrode 170, arranged respectively on the upper surface 510 and on the lower surface 520 of the circuit board 500, are electrically connected with each other. In particular, a low-voltage capacitor 320 is arranged on the upper surface 510 of the circuit board 500. This low-voltage capacitor 320 is electrically connected in series between the sensing electrode 170 and a grounding contact 340 held on electrical ground 350. The grounding contact 340 on the circuit board 500 can be connected to an external grounding point via a grounding wire 560 leading from the grounding contact 340 through an aperture in a lid 690 to outside the sensored insulation plug 1.

The low-voltage capacitor 320 forms the low-voltage portion 380 of the voltage divider 400 for sensing the elevated voltage, with the primary capacitor 150 forming the high-voltage portion 370 of the voltage divider, as shown in FIG. 2.

The circuit board 500 is embedded in the plug body 140. The electrically conductive, grounded lid 690 helps in shielding the electric and electronic components 480 on the circuit board 500 against external electrical fields.

The divided voltage of the voltage divider 400 can be accessed at a signal contact 360 on the circuit board 500. A signal wire 530 makes the signal voltage available outside the sensored insulation plug 1, it is led through an aperture in the lid 690. As is generally known for voltage dividers, the signal voltage varies proportionally with the elevated voltage of the high-voltage electrode 160, so that the elevated voltage of the high-voltage electrode 160—and thereby the elevated voltage of the connection element 80 of the separable connector 10—can be determined by measuring the signal voltage and multiplying it with the dividing ratio of the voltage divider.

Figure 4:
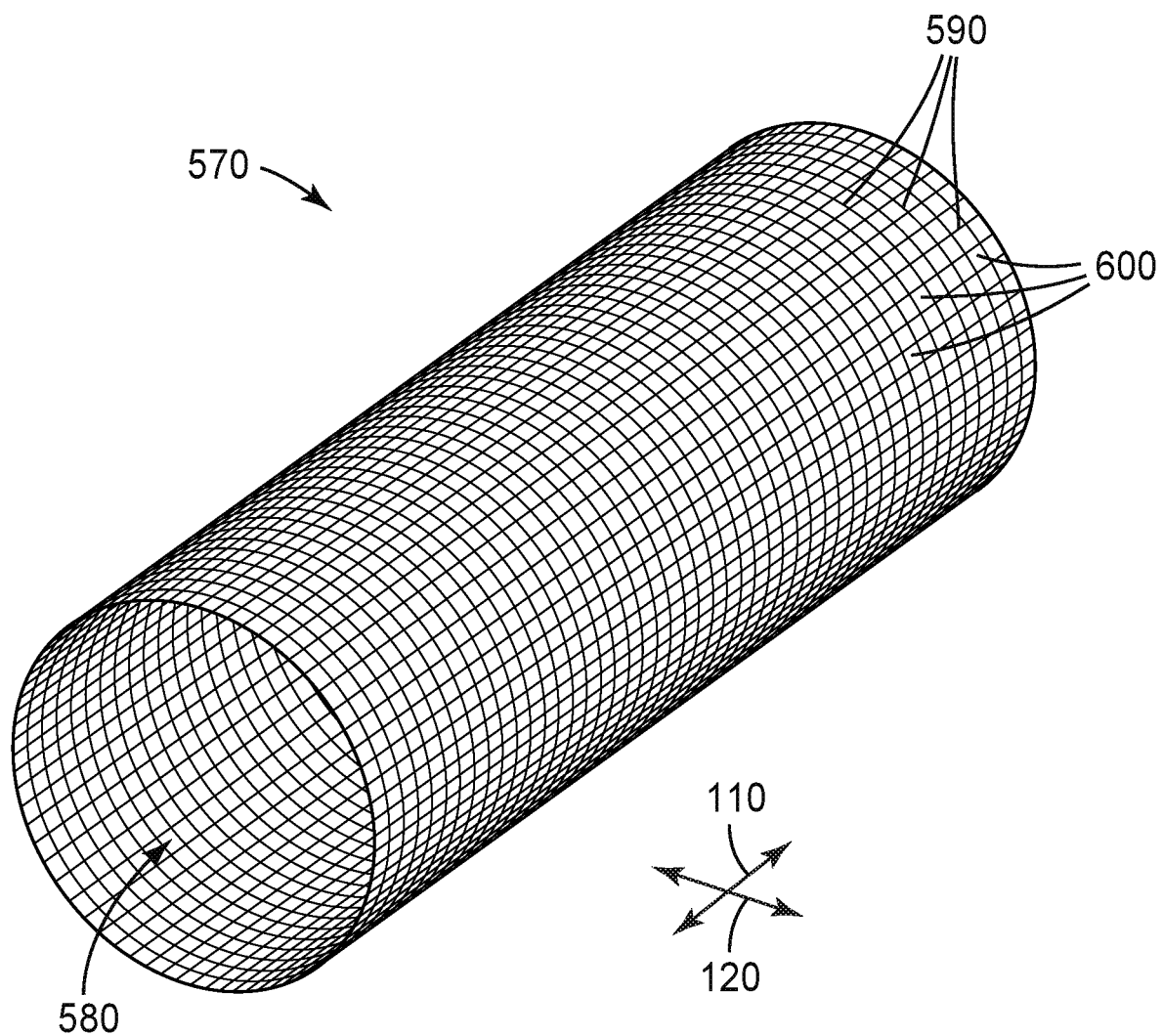
FIG. 4 Perspective view of a deformable mesh of conductive wires, usable in a sensing electrode of a sensored insulation plug according to the present disclosure.

FIG. 4 is a perspective view of the sensing electrode 170 of the first sensored insulation plug 1. The sensing electrode 170 is a deformable mesh 570 of crossed conductive wires 590. The mesh 570 is of a tubular shape, the "tube" shape defining an interior space 580 of the sensing electrode 170. The interior space 580 is the space inside, i.e. radially inward from, the mesh 570. When the sensored insulation plug 1 is assembled, the interior space 580 receives the high-voltage electrode 160, so that the mesh 570 of the sensing electrode 170 is arranged around the high-voltage electrode 160. Once insulating material 610 is cast or molded around the sensing electrode 170 and the high-voltage electrode 160 to form the plug body 140, the sensing electrode 170 is embedded in the plug body.

The wires 590 have a diameter of 0.2 mm and are of a ductile stainless steel material, so that the mesh 570 can be deformed by a flow of liquid insulating material 610 in a casting process for making the plug body 140. By selecting appropriate material for the wires 590 of the mesh 570 and a suitable mesh geometry, the deformable mesh is adapted to be deformed by insulating material 610 in liquid state flowing around the mesh 570 before solidification of the insulating material 610.

The wires 590 are spaced appropriately to form a plurality of apertures 600 between the wires 590, extending in a thickness direction of the mesh 570. These apertures 600 allow portions of the insulating material 610 on opposite sides of the mesh 570, i.e. portions inside the mesh 570 in the interior space 580 and portions outside the mesh 570, to be mechanically connected with each other by insulating material 610 in the apertures 600. This mechanical connection through the apertures 600 results in the insulating material 610 extending through the apertures 600. Insulating material 610 in the apertures 600 holds insulating material 610 radially inward from the mesh 570 in mechanical connection, and contiguous, with insulating material 610 radially outward of the mesh 570 during and after solidification of the insulating material 610. This mechanical connection reduces the risk of delamination of the insulating material 610 at the mesh 570 and the mechanical separation, i.e. delamination, of the inward portion from the outward portion of the insulating material 610.

The mesh 570 shown in FIG. 4 comprises wires 590 extending in length direction 110 of the sensing electrode 170 and wires 590 extending in circumferential direction, crossing each other at a 90° angle. It is contemplated that other mesh geometries may be used for a deformable mesh 570 usable as a sensing electrode 170 of a sensed insulation plug 1 as described herein. Wires of a deformable mesh may, for example, cross at other angles, wires may extend in more than two directions, wires may be woven or knotted, spacing between adjacent wires may vary, wires of different diameters may be used in one deformable mesh, etc. Such geometries—as well as different materials and diameters of the wires—may be usable in a sensed insulation plug 1 described herein, provided that the resulting mesh 570 comprises apertures 600 suitable for allowing portions of the insulating material 610 on opposite sides of the mesh 570 to be mechanically connected with each other by insulating material 610 in the apertures 600, and provided the resulting mesh 570 is sufficiently deformable to be deformed by insulating material 610 in liquid state flowing around the mesh 570 before solidification of the insulating material 610.

The invention claimed is:

1. A sensored insulation plug for being inserted into a rear cavity of a medium-voltage or high-voltage separable connector in a power distribution network of a national grid, and operable to insulate a connection element of the separable connector on an elevated voltage and to sense the elevated voltage, the sensored insulation plug comprising
   a) a plug body formed by a solidified insulating material, and
   b) a primary capacitor, operable as a high-voltage capacitor in a voltage divider for sensing the elevated voltage, the primary capacitor having
      i) a high-voltage electrode for direct electrical connection to the elevated voltage;
      ii) a sensing electrode of a tubular shape, embedded in the plug body, arranged around the high-voltage electrode, and comprising a mesh of conductive wires forming a plurality of apertures between the wires to allow portions of the insulating material on opposite sides of the mesh to be mechanically connected with each other by insulating material in the apertures while the insulating material solidifies and thereafter;
      iii) a dielectric formed by a portion of the insulating material arranged between the sensing electrode and the high-voltage electrode,
   wherein the mesh is a deformable mesh, adapted to be deformed by insulating material in liquid state flowing around the mesh before solidification of the insulating material.

2. The sensored insulation plug according to claim 1, wherein at least one aperture of the plurality of the apertures is filled with insulating material mechanically connecting portions of the insulating material on opposite sides of the mesh with each other.

3. The sensored insulation plug according to claim 1, wherein the mesh of conductive wires forms one thousand or more apertures.

4. The sensored insulation plug according to claim 1, wherein the wires comprise copper, silver, gold, or stainless steel.

5. The sensored insulation plug according to claim 1, wherein the wires have a diameter of between 0.05 mm and 1 mm.

6. The sensored insulation plug according to claim 1, wherein the mesh is a woven mesh or a knotted mesh or a looped mesh.

7. The sensored insulation plug according to claim 1, wherein the apertures have respective sizes of between 0.05 mm and 2 mm, as measured in the shortest extension of each aperture.

8. The sensored insulation plug according to claim 1, wherein the mesh is a plastically deformable mesh.

9. The sensored insulation plug according to claim 1, wherein the mesh is an elastically deformable mesh.

10. The sensored insulation plug according to claim 1, wherein the mesh has a generally cylindrical shape defining an axial direction and radial directions orthogonal thereto, and wherein the mesh is adapted to be deformed in radial directions.

11. The sensored insulation plug according to claim 1, wherein the insulating material comprises an epoxy resin and, optionally, a filler, such as $SiO_2$ or $Al_2O_3$ or another electrically insulating inorganic material.

12. The sensored insulation plug according to claim 1, further comprising a shield electrode of generally tubular shape, embedded in the plug body, arranged around, and enveloping, the sensing electrode.

13. The sensored insulation plug according to claim 12, further comprising an electrically insulating spacer layer arranged radially between the shield electrode and the sensing electrode, wherein optionally the spacer layer comprises a layer of nonwoven material or a polymeric layer.

14. The sensored insulation plug according to claim 1, further comprising a circuit board, embedded in the plug body and supporting the sensing electrode.

15. A power distribution network for distributing electrical power at medium or high voltages, the network comprising:
   a) a separable connector having a rear cavity and a connection element on elevated voltage when in use and accessible through the rear cavity; and
   b) a sensored insulation plug according to claim 1, inserted into the rear cavity to insulate the connection element and to sense the elevated voltage of the connection element, wherein the high-voltage electrode is directly electrically connected with the connection element.

16. A process of making a sensored insulation plug for being inserted into a rear cavity of a medium-voltage or high-voltage separable connector in a power distribution network of a national grid, and operable to insulate a connection element of the separable connector on elevated voltage and to sense the elevated voltage, the process comprising the steps, in this sequence, of:
   a) providing a high-voltage electrode of a primary capacitor for direct electrical connection to the elevated voltage, and a sensing electrode of the primary capacitor, having a tubular shape and comprising a mesh of conductive wires forming a plurality of apertures between the wires to allow portions of an insulating material on opposite sides of the mesh to be mechanically connected with each other by insulating material in the apertures while the insulating material solidifies and thereafter, wherein the mesh is a deformable mesh, adapted to be deformed by insulating material in liquid state flowing around the mesh before solidification of the insulating material;

b) arranging the sensing electrode around the high-voltage electrode;

c) molding or casting a liquid insulating material around the high-voltage electrode and the sensing electrode for forming a plug body of the sensored insulation plug, such that the sensing electrode is embedded in the insulating material and such that a portion of the insulating material forms a dielectric between the sensing electrode and the high-voltage electrode; and d) solidifying the insulating material.

17. A sensored insulation plug for being inserted into a rear cavity of a medium-voltage or high-voltage separable connector in a power distribution network of a national grid, and operable to insulate a connection element of the separable connector on an elevated voltage and to sense the elevated voltage, the sensored insulation plug comprising a) a plug body formed by a solidified insulating material, and b) a primary capacitor, operable as a high-voltage capacitor in a voltage divider for sensing the elevated voltage, the primary capacitor having i) a high-voltage electrode for direct electrical connection to the elevated voltage;

ii) a sensing electrode of a tubular shape, embedded in the plug body, arranged around the high-voltage electrode, and comprising a mesh of conductive wires forming a plurality of apertures between the wires to allow portions of the insulating material on opposite sides of the mesh to be mechanically connected with each other by insulating material in the apertures while the insulating material solidifies and thereafter;

iii) a dielectric formed by a portion of the insulating material arranged between the sensing electrode and the high-voltage electrode, wherein the mesh is a deformable mesh, adapted to be deformed by insulating material in liquid state flowing around the mesh before solidification of the insulating material, wherein the mesh has a generally cylindrical shape defining an axial direction and radial directions orthogonal thereto, and wherein the mesh is adapted to be deformed in radial directions.

18. A sensored insulation plug for being inserted into a rear cavity of a medium-voltage or high-voltage separable connector in a power distribution network of a national grid, and operable to insulate a connection element of the separable connector on an elevated voltage and to sense the elevated voltage, the sensored insulation plug comprising a) a plug body formed by a solidified insulating material, and b) a primary capacitor, operable as a high-voltage capacitor in a voltage divider for sensing the elevated voltage, the primary capacitor having i) a high-voltage electrode for direct electrical connection to the elevated voltage;

ii) a sensing electrode of a tubular shape, embedded in the plug body, arranged around the high-voltage electrode, and comprising a mesh of conductive wires forming a plurality of apertures between the wires to allow portions of the insulating material on opposite sides of the mesh to be mechanically connected with each other by insulating material in the apertures while the insulating material solidifies and thereafter;

iii) a dielectric formed by a portion of the insulating material arranged between the sensing electrode and the high-voltage electrode, wherein the mesh is a deformable mesh, adapted to be deformed by insulating material in liquid state flowing around the mesh before solidification of the insulating material;

a shield electrode of generally tubular shape, embedded in the plug body, arranged around, and enveloping, the sensing electrode; and an electrically insulating spacer layer arranged radially between the shield electrode and the sensing electrode.

19. The sensored insulation plug of claim 18, wherein the spacer layer comprises a layer of nonwoven material or a polymeric layer.

* * * * *